United States Patent [19]

Asami et al.

[11] 4,367,147

[45] Jan. 4, 1983

[54] METHOD OF RECOVERING CHARACTERISTICS OF DETERIORATED CATION EXCHANGE MEMBRANE

[75] Inventors: Shunichi Asami; Toru Seita; Akihiko Shimizu, all of Shin-nanyo, Japan

[73] Assignee: Toyo Soda Manufacturing Co., Ltd., Yamaguchi, Japan

[21] Appl. No.: 22,619

[22] Filed: Mar. 21, 1979

[30] Foreign Application Priority Data

May 31, 1978 [JP] Japan ................................. 53/64320
May 31, 1978 [JP] Japan ................................. 53/64321

[51] Int. Cl.$^3$ ............................................. B01D 11/00
[52] U.S. Cl. ..................................... 210/636; 210/638; 210/639; 204/180 B
[58] Field of Search ....................... 210/30 R, 32, 636; 521/26; 204/98, 180 B, 296, 180 P

[56] References Cited

U.S. PATENT DOCUMENTS

| | | | |
|---|---|---|---|
| 3,793,163 | 2/1974 | Dotson | 204/98 |
| 3,971,706 | 7/1976 | Hirozawa et al. | 204/98 |
| 3,988,223 | 10/1976 | Hirozawa | 204/98 |
| 4,115,240 | 9/1978 | Asawa et al. | 204/98 |
| 4,116,781 | 9/1978 | Dorio et al. | 204/98 |
| 4,118,308 | 10/1978 | Specht | 204/98 |

FOREIGN PATENT DOCUMENTS 594888 3/1960 Canada .................................. 204/98

*Primary Examiner*—John Adee
*Attorney, Agent, or Firm*—Oblon, Fisher, Spivak, McClelland & Maier

[57] ABSTRACT

Characteristics of a cation exchange membrane used for an electrolysis of an alkali metal chloride are recovered by immersing the perfluorocarbon type cation exchange membrane in an organic solvent having a water miscibility and a boiling point of higher than 120° C. in 760 mmHg; holding the immersed membrane between a pair of smooth plates and heating at 40° C. to 180° C.; treating the heat-treated membrane in hydrochloric acid and then, immersing it in an aqueous solution of sodium hydroxide and the organic solvent is preferably ethyleneglycol, propyleneglycol, isopropyleneglycol butanediol, pentanediol, hexanediol, glycerin or polyethyleneglycol.

9 Claims, No Drawings

METHOD OF RECOVERING CHARACTERISTICS OF DETERIORATED CATION EXCHANGE MEMBRANE

BACKGROUND OF THE INVENTION

1. Field of the Invention

The present invention relates to a method of recovering characteristics of a deteriorated cation exchange membrane used in an electrolysis of an alkali metal chloride. More particularly, it relates to a method of recovering characteristic of a deteriorated cation exchange membrane used in an electrolysis of an aqueous solution of an alkali metal chloride to obtain chlorine and an alkali metal hydroxide.

2. Description of the Prior Arts

It has been known to produce chlorine in an anode compartment and to produce an alkali metal hydroxide in a cathode compartment by partitioning the anode compartment and the cathode compartment in the cell with a diaphragm and supplying an aqueous solution of an alkali metal chloride.

An asbestos diaphragm has been used as the diaphragm. However, in the asbestos diaphragm method, the alkali metal hydroxide is contaminated with an alkali metal chloride to decrease the purity and the alkali metal hydroxide having high concentration could not be obtained advantageously. In order to overcome the disadvantages, the use of a cation exchange membrane as the diaphragm has been proposed and considered as the important process.

The disadvantages of the asbestos diaphragm process could be overcome, however, when the cation exchange membrane is continuously used, the current efficiency of the membrane is gradually decreased and a cell voltage is gradually increased to be uneconomical.

On the other hand, the cation exchange membrane for electrolysis of an alkali metal chloride is usually expensive so that most of the cost for producing an alkali metal hydroxide is spent as the cost for the membrane.

From these viewpoints, it is economically advantageous to recover characteristics of the deteriorated membrane or to use repeatedly the membrane.

It has been proposed to recover characteristics of a cation exchange membrane from these viewpoints, for example, a method of swelling a perfluorocarbon type cation exchange membrane with an organic solvent and removing the organic solvent from the membrane (Japanese Unexamined Patent Publication No. 130,491/1977); a method of heat-treating a fluorinated carboxylic acid type cation exchange membrane (Japanese Unexamined Patent Publication No. 3999/1978); a method of contacting a perfluorocarbon type cation exchange membrane with a solution of an acid having oxidizing property (Japanese Unexamined Patent Publication No. 37598/1978). Various other methods have been proposed to improve the recovery of cation exchange membranes.

The inventors have studied to improve the recovery of characteristics of the deteriorated cation exchange membrane for electrolysis of an alkali metal chloride.

SUMMARY OF THE INVENTION

It is an object of the present invention to provide a method of recovering characteristics of a deteriorated cation exchange membrane used for an electrolysis of an alkali metal chloride to impart high current efficiency of the membrane and low cell voltage.

The foregoing and other objects of the present invention have been attained by providing a method of recovering characteristics of a cation exchange membrane which comprises immersing the perfluorocarbon type cation exchange membrane in an organic solvent having a water miscibility and a boiling point of higher than 120° C. in 760 mmHg; holding the immersed membrane between a pair of smooth plates and heating at 40° C. to 180° C.; treating the heat-treated membrane in hydrochloric acid and then, immersing it in an aqueous solution of sodium hydroxide.

DETAILED DESCRIPTION OF THE PREFERRED EMBODIMENTS

The reason why recovering characteristic of the deteriorated cation exchange membrane by the method of the present invention is not clear but it is considered as follows.

The ion exchange groups in the deteriorated cation exchange membrane may be reoriented to the original condition by the effect of the organic solvent and the heating. In the method of the present invention, sometimes, the current efficiency is increased over the original characteristics by the treatment of the present invention. This phenomenon is considered to be given by orienting cation exchange groups at the positions for preventing effectively permeation of hydroxyl groups, by the method. The fact can be considered from the fact that the treatment is not effective for crosslinked type cation exchange membranes such as cation exchange membrane of a copolymer of styrene and divinyl benzene.

However, there is considered to remain strain in the membrane when the membrane is treated with the organic solvent. The strain is eliminated by the treatment with hydrochloric acid.

This consideration is only for illustration and the present invention is not limited by the consideration.

The cation exchange membranes used for the method of the present invention are preferably as follows.

(1) Cation exchange membranes having one surface layer having groups of $-SO_2NMR_1$ wherein M is H or an alkali metal atoms; $R_1$ is $-C_nH_{2n+1}$ (n=0 to 6), $-C_nH_{2n}COOM$ (n and M are defined above)

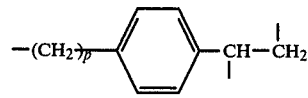

(p=0 to 6); phenyl group or $R_2MNO_2S-$ (M is defined above; $R_2$ is

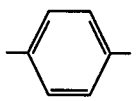

or $-C_mH_{2m}-$ (m=1 to 6). The other parts of the cation exchange membrane have $-SO_3M$ (M is defined above).

In order to obtain such cation exchange membranes, copolymers having the following units are used.

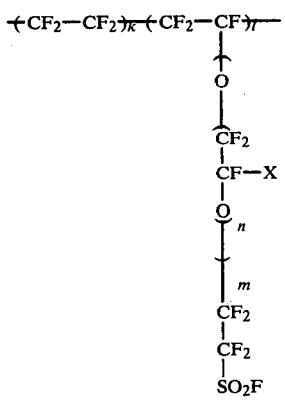

X=—CF$_3$, —CF$_2$—O—CF$_3$;
n=0 or 1~5;
m=0 or 1;
k/l=3-16 preferably 5-13
especially,

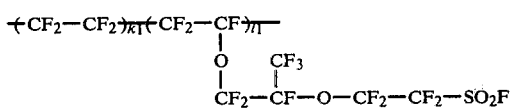  (1)

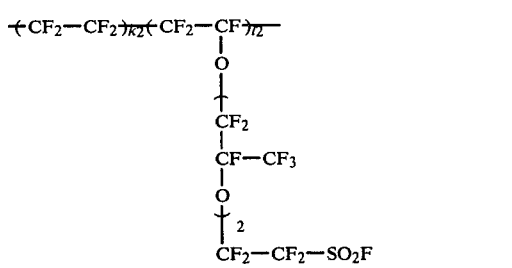  (2)

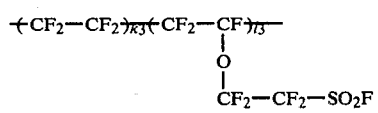  (3)

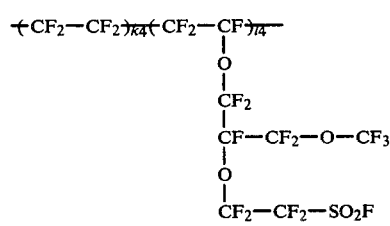  (4)

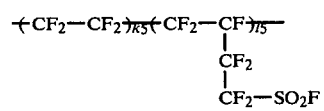  (5)

It is preferable to use the copolymer having 700 to 2800 g of a weight of the resin per 1 equivalent of sulfonyl halide group (hereinafter referring to as EW=700 to 2800 etc.), preferably EW=1000 to 1500.

The optimum copolymers have the units having the formula (1).

The polymers having the units is fabricated in a form of a membrane and one surface of the membrane is reacted with ammonia gas, methylamine, ethylamine, n-propylamine, aminoacetic acid, 2-aminopropanoic acid, 7-aminoheptanoic acid, aniline, aminostyrene adduct polymer, ethylenediamine, 1,3-diaminopropane, or 1,6-diaminohexane. A depth of the reacted layer is in a range of 0.01 to 80% especially 0.1 to 30% to a total thickness of the membrane. If necessary, the resulting membrane is treated at high temperature or hydrolyzed.

(2) Cation exchange membranes having one surface layer having —COOM (M is defined above). The other parts of the membrane have —SO$_3$M (M is defined above).

In order to obtain such cation exchange membranes, one surface of the membrane of the copolymer having units of (1) to (5) is treated with a reducing agent.

(3) Cation exchange membranes wherein all of cation exchange groups in the cation exchange membrane are —COOM (M is defined above).

In order to obtain such cation exchange membranes, copolymers having the following units are fabricated and hydrolyzed.

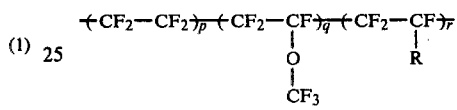

wherein

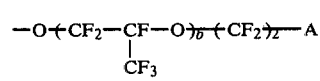

a is an integer of 2 to 4; b is 0 or an integer of 1 to 5; c is an integer of 1 to 5; A is COF, COOCH$_3$ and (p+q)/r=0.5 to 19 preferably 1 to 10.

Suitable units of the copolymer include

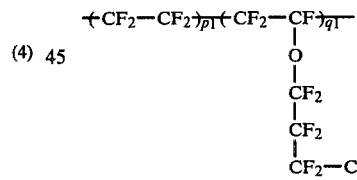

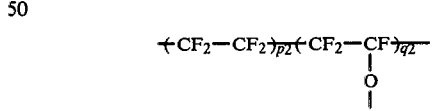

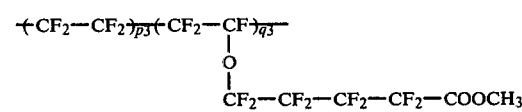

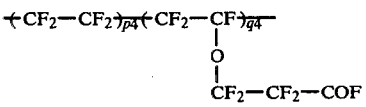

-continued $$+CF_2-CF_2\overline{)_{p5}}(CF_2-CF\overline{)_{q5}}-$$
$$|$$
$$O$$
$$|$$
$$CF_2-CF-O-CF_2-CF_2-COF$$
$$|$$
$$CF_3$$

$$+CF_2-CF_2\overline{)_{p6}}(CF_2-CF\overline{)_{q6}}-$$
$$|$$
$$COOCH_3$$

$$+CF_2-CF_2\overline{)_{p7}}(CF_2-CF\overline{)_{q7}}(CF_2-CF\overline{)_{r1}}-$$
$$|\qquad\qquad|$$
$$O\qquad\qquad O$$
$$|\qquad\qquad|$$
$$CF_3\qquad CF_2-CF_2-CF_2-COF$$

$$+CF_2-CF_2\overline{)_{p8}}(CF_2-CF\overline{)_{q8}}(CF_2-CF\overline{)_{r2}}-$$
$$|\qquad\qquad|$$
$$O\qquad\qquad O$$
$$|\qquad\qquad|$$
$$CF_3\qquad CF_2-CF_2-CF_2-COOCH_3$$

$$+CF_2-CF_2\overline{)_{p9}}(CF_2-CF\overline{)_{q9}}(CF_2-CF\overline{)_{r3}}-$$
$$|\qquad\qquad|$$
$$O\qquad\qquad O$$
$$|\qquad\qquad|$$
$$CF_3\qquad CF_2$$
$$\qquad\qquad |_4$$
$$\qquad\qquad COOCH_3$$

$$+CF_2-CF_2\overline{)_{p10}}(CF_2-CF\overline{)_{q10}}(CF_2-CF\overline{)_{r4}}-$$
$$|\qquad\qquad|$$
$$O\qquad\qquad O$$
$$|\qquad\qquad|$$
$$CF_3\qquad CF_2-CF_2-COF$$

$$+CF_2-CF_2\overline{)_{p11}}(CF_2-CF\overline{)_{q11}}(CF_2-CF\overline{)_{r5}}-$$
$$|\qquad\qquad|$$
$$O\qquad\qquad O$$
$$|\qquad\qquad|$$
$$CF_3\qquad CF_2$$
$$\qquad\qquad|$$
$$\qquad F_3C-CF$$
$$\qquad\qquad|$$
$$\qquad\qquad O-CF_2-CF_2-COF$$

$$+CF_2-CF_2\overline{)_{p12}}(CF_2-CF\overline{)_{q12}}(CF_2-CF\overline{)_{r6}}-$$
$$|\qquad\qquad|$$
$$O\qquad\qquad COOCH_3$$
$$|$$
$$CF_3$$

It is possible to reinforce the cation exchange membrane with a suitable reinforcing substance such as polyester fabric, rayon fabric and polytetrafluoroethylene fabric in order to improve the functional characteristics of the membrane.

The cation exchange membrane is used for an electrolysis of an alkali metal chloride. When the cation exchange membrane is used for electrolysis for a long time, the current efficiency of the membrane is decreased and the cell voltage is increased. The deterioration of the characteristics may be caused because the cation exchange groups could not be kept in the original positions through the reason of the deterioration is not clear.

In accordance with the method of the present invention, the deteriorated cation exchange membrane used in the electrolysis is treated for recovering its characteristics, as follows.

A deteriorated cation exchange membrane used in an electrolysis of an aqueous solution of an alkali metal chloride is immersed in an organic solvent having a water miscibility and a boiling point of higher than 120° C. in 760 mmHg and then, it is held between a pair of smooth plates and heated at 40° C. to 180° C. and treated in hydrochloric acid and then, immersed in an aqueous solution of sodium hydroxide.

Suitable organic solvents include ethyleneglycol; propyleneglycol; isopropyleneglycol; butanediols e.g. 2,3-butanediol; pentanediols e.g. 1,5-pentanediol; hexanediols e.g. 1,6-hexanediol; glycerin and polyethyleneglycol. Polyethyleneglycol having a molecular weight of 200 to 700 especially 200 to 600 is preferably used. The organic solvent can be used as a mixture thereof.

In the immersing step, the deteriorated cation exchange membrane is disassembled from an electrolytic cell and is immersed in the organic solvent. The ion exchange groups in the cation exchange membrane can be acid form or salt form. The time for immersing is depending upon a kind of the organic solvent and it is usually in a range of 2 to 50 hours. When polyethyleneglycol is used, it is in a range of about 5 to 50 hours. In the other case, it is in a range of about 2 to 30 hours. The organic solvent can be used at lower than a boiling point.

In the heat-treating step, the time for heating is usually in a range of 30 minutes to 30 hours. When polyethyleneglycol is used, the time for heating is preferably in a range of 1 to 50 hours. As smooth plates, glass plate, stainless steel plate or polytetrafluoroethylene plate can be used.

The treated cation exchange membrane is further treated with hydrochloric acid. The concentration of hydrochloric acid is usually in a range of 0.05 N to 10 N preferably 0.5 N to 8 N. The temperature for treating with hydrochloric acid is in a range of 40° C. to 95° C. preferably 60° C. to 85° C. The time for treating is in a range of 30 minutes to 5 hours.

The treated cation exchange membrane is immersed in an aqueous solution of sodium hydroxide.

The invention will be further illustrated by certain examples which are provided for purposes of illustration only and are not intended to be limiting in any manner.

EXAMPLE 1

A membrane made of a copolymer of $CF_2=CF_2$ and

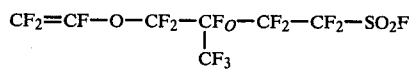

(EW=1200 and thickness of 7 mil) was used. Ethylenediamine was contacted with one surface of the membrane and then, the surface was washed and dried. According to a coloring test of a sectional part of the membrane, it was found to react it in a depth of 1.5 mil.

The membrane was reinforced with polytetrafluoroethylene fabric in the non-treated side by a heat bonding and it was heated at 180° to 200° C. and hydrolyzed to obtain a cation exchange membrane. The cation exchange membrane (I) in acid type was used.

The resulting cation exchange membrane was used as a membrane for partitioning an anode compartment and a cathode compartment to prepare an electrolytic cell having effective area of 1 m². An aqueous solution of sodium chloride was fed into the anode compartment and a concentration of sodium hydroxide was maintained to 28 to 29 wt.% and a current was passed at a current density of 30 A/dm$^2$. The current efficiency was 90% and the cell voltage was 4.32 V. After continuing the electrolysis for 2 months, the current efficiency was reduced to 83% and the cell voltage was raised to 4.45 V.

The electrolytic cell was disassembled and the deteriorated cation exchange membrane was cut in a size of 30 cm×30 cm.

One of the membrane was immersed in propyleneglycol at room temperature for 1 day and the membrane was held between smooth plates made of glass plate, chloroprene rubber and polyester sheet, and heat-treated at 120° C. for 8 hours and then, treated in 3 N-HCl at 65° C. for 2 hours and the treated membrane was kept at room temperature for 1 day and immersed in 6 N-NaOH for 2 days.

The resulting cation exchange membrane was used to assemble a two compartment type electrolytic cell having effective area of 20 cm×20 cm and the electrolysis was carried out under the same condition. The current efficiency was 92% and the cell voltage was 4.31 V.

EXAMPLE 2 TO 4

In accordance with the process of Example 1 except using the following polyol instead of propyleneglycol, the deteriorated cation exchange membrane was treated, and the electrolysis was carried out. The results are as follows.

| Example | Polyol | Current efficiency | Cell voltage |
|---|---|---|---|
| 2 | ethyleneglycol | 91% | 4.32 |
| 3 | glycerin | 92% | 4.30 |
| 4 | ethyleneglycol + glycerin = 1:1 | 91% | 4.35 |

EXAMPLE 5

The deteriorated cation exchange membrane of Example 1 was treated with 1 N-HCl to convert the ion exchange groups to acid form. The membrane was immersed in propyleneglycol at room temperature for 2 days. The treated membrane was held between smooth plates made of glass plate, chloroprene rubber sheet and polyester sheet and heat-treated at 110° C. for 7 hours. The treated membrane was treated in 2 N-HCl at 65° C. for 2 hours and was immersed in 8 N-NaOH for 8 days.

The resulting membrane was used in the electrolytic cell and the electrolysis was carried out. The current efficiency was 91% and the cell voltage was 4.27 V.

REFERENCE 1

The deteriorated membrane of Example 1 was treated with 1 N-HCl to convert the ion exchange groups to acid form. The treated membrane was held between smooth plates made of glass plate, chloroprene rubber sheet and polyester sheet and heat-treated at 110° C. for 7 hours. The treated membrane was treated in 2 N-HCl at 65° C. for 2 hours and was immersed in 8 N-NaOH for 8 days.

The resulting membrane was used in the electrolytic cell and the electrolysis was carried out. The current efficiency was 86% and the cell voltage was 4.57 V.

EXAMPLE 6

A membrane of a copolymer of CF$_2$=CF$_2$ and

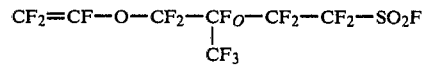

(EW=1200 and thickness of 7 mils) was hydrolyzed and treated in 1 N-HCl to convert the ion exchange groups to acid form.

The resulting cation exchange membrane was treated with a mixture of phosphorus pentachloride and phosphorus oxychloride (ratio of 1:1 by weight) to convert it into sulfonyl chloride form and the membrane was washed with CCl$_4$ and dried in vacuum.

The conversion of sulfonyl chloride groups was confirmed by a surface infrared spectrum. Two sheets of the resulting membrane were overlapped and set in a reactor and 57% HI was fed to treat and to form carboxylic acid groups on only one surface. The confirmation of the carboxylic acid groups was carried by the surface infrared spectrum. As the result of a coloring test, the thickness of the carboxylic acid layer was 1.3 mil.

The sulfonyl chloride groups remained in the membrane was hydrolyzed to form sulfonic acid groups.

The resulting cation exchange membrane was used to assemble a two compartment type electrolytic cell having effective area of 20 cm×20 cm and the electrolysis was carried out under the same condition. An aqueous solution of sodium chloride was fed into the anode compartment and a concentration of sodium hydroxide was maintained 24 to 25 wt.% and a current was passed at a current density of 30 A/dm$^2$. The current efficiency was 90% and the cell voltage was 3.75 V. After continuing the electrolysis for 3 months, the current efficiency was reduced to 84% and the cell voltage was raised to 3.93 V.

The electrolytic cell was disassembled and the deteriorated cation exchange membrane was taken out and treated in 1 N-HCl to convert the ion exchange groups to acid form.

The membrane was immersed in propyleneglycol at room temperature for 1 day and the membrane was held between smooth plates made of glass plate, chloroprene rubber and polyester sheet, and heat-treated at 130° C. for 8 hours and then, treated in 4.5 N-HCl at 65° C. for 2 hours and immersed in 6 N-NaOH for 2 weeks.

The resulting membrane was used in the electrolytic cell and the electrolysis was carried out under the same condition. The current efficiency was 89% and the cell voltage was 3.67 V.

EXAMPLE 7

A terpolymer of CF$_2$=CF$_2$, CF$_2$=CF—O—CF$_3$ and CF$_2$=CF—O(CF$_2$)$_3$—COOCH$_3$ was used to fabricate a membrane and hydrolyze it to obtain a cation exchange membrane (ion exchange capacity of 1.2 meq/g.dry.resin: thickness of 0.2 mm).

The resulting cation exchange membrane was used to assemble a two compartment type electrolytic cell having effective area of 20 cm×20 cm and the electrolysis was carried out. An aqueous solution of sodium chloride was fed into the anode compartment and a concentration of sodium hydroxide was maintained 29 to 30 wt.% and a current was passed at a current density of 30 A/dm$^2$. The current efficiency was 91% and the cell voltage was 4.68 V. After continuing the electrolysis for 3 months, the current efficiency was reduced to 86% and the cell voltage was raised to 4.83 V.

The electrolytic cell was disassembled and the deteriorated cation exchange membrane was taken out and treated in 1 N-HCl to convert the ion exchange groups to acid form.

The membrane was immersed in propyleneglycol at room temperature for 1 day and the membrane was held between smooth plates made of glass plate, chloroprene rubber and polyester sheet, and heat-treated at 130° C. for 8 hours and then, treated in 4.0 N-HCl at 65° C. for 2 hours in 6 N-NaOH for 2 weeks.

The resulting membrane was used in the electrolytic cell and the electrolysis was carried out under the same condition. The current efficiency was 89% and the cell voltage was 4.51 V.

EXAMPLE 8

In accordance with the process of Example 1, the electrolysis of the aqueous solution of sodium chloride was carried out for 3 months, by using the membrane of Example 1. The deterioration of the membrane was found since the current efficiency was decreased and the voltage was increased.

In accordance with the process of Example 1 except using polyethyleneglycol having a molecular weight of 200 instead of propyleneglycol, the deteriorated cation exchange membrane was treated and the electrolysis was carried out. The result is as follows.

| Cation exchange membrane | Current efficiency | Cell voltage |
|---|---|---|
| Initial | 90% | 4.32 V |
| Deteriorated | 82% | 4.52 V |
| Recovered | 91% | 4.35 V |

EXAMPLE 9

The deteriorated cation exchange membrane of Example 8 was treated with 1 N-HCl to convert the ion exchange groups to acid form. The membrane was immersed in polyethyleneglycol having a molecular weight of 300 at room temperature for 1 day. The treated membrane was held between smooth plates made of glass plate, chloroprene rubber sheet and polyester sheet and heat-treated at 110° C. for 10 hours. The treated membrane was treated in 2.5 N-HCl at 65° C. for 2 hours, then was set for 1 day a room temperature and was immersed in 6 N-NaOH for 2 weeks.

The resulting cation exchange membrane was used to assemble a two compartment type electrolytic cell having effective area of 20 cm×20 cm and the electrolysis was carried out under the same condition. The current efficiency was 92% and the cell voltage was 4.38 V.

EXAMPLE 10

The deteriorated cation exchange membrane of Example 8 was treated with 1 N-HCl to convert the ion exchange groups to acid form. The membrane was immersed in polyethyleneglycol having a molecular weight of 600 at 50° C. for 1 day. The treated membrane was held between smooth plates made of glass plate, chloroprene rubber sheet and polyester sheet and heat-treated at 120° C. for 3 hours. The treated membrane was treated in 3 N-HCl at 65° C. for 2 hours, then was set for 1 day at room temperature and was immersed in 6 N-NaOH for 2 weeks.

The resulting cation exchange membrane was used to assemble a two compartment type electrolytic cell having effective area of 20 cm×20 cm and the electrolysis was carried out under the same condition. The current efficiency was 90% and the cell voltage was 4.21 V.

REFERENCE 2

The deteriorated cation exchange membrane of Example 8 was treated with 1 N-HCl to convert the ion exchange groups to acid form. The treated membrane was held between smooth plates made of glass plate, chloroprene rubber sheet and polyester sheet and heat-treated at 120° C. for 8 hours. The treated membrane was treated in 2 N-HCl at 65° C. for 2 hours and was immersed in 6 N-NaOH for 2 weeks.

The resulting cation exchange membrane was used to assemble a two compartment type electrolytic cell having effective area of 20 cm×20 cm and the electrolysis was carried out under the same condition. The current efficiency was 88% and the cell voltage was 4.61 V.

EXAMPLE 11

In accordance with the process of Example 6 except using polyethyleneglycol having a molecular weight of 300 instead of propyleneglycol, the deteriorated cation exchange membrane was treated and the electrolysis was carried out. The result is as follows.

| Cation exchange membrane | Current efficiency | Cell voltage |
|---|---|---|
| Initial | 90% | 3.75 V |
| Deteriorated | 84% | 3.93 V |
| Recovered | 88% | 3.61 V |

EXAMPLE 12

In accordance with the process of Example 7 except using polyethyleneglycol having a molecular weight of 300 instead of propyleneglycol, the deteriorated cation exchange membrane was treated and the electrolysis was carried out. The result is as follows.

| Cation exchange membrane | Current efficiency | Cell voltage |
|---|---|---|
| Initial | 91% | 4.68 V |
| Deteriorated | 86% | 4.83 V |
| Recovered | 89% | 4.49 V |

What is claimed is:

1. A method of recovering the characteristics of a cation exchange perfluorocarbon membrane used for the electrolysis of an alkali metal chloride which sequentially comprises:

immersing the perfluorocarbon type cation exchange membrane in a solvent which consists essentially of a water-miscible organic solvent having a boiling point higher than 120° C. at 760 mmHg;

holding the immersed whole membrane between a pair of smooth plates while heating at 40° C. to 180° C.;

treating the heat-treated membrane in hydrochloric acid and subsequently immersing the membrane in an aqueous solution of sodium hydroxide.

2. A method according to claim 1 wherein the cation exchange membrane used in the method has free acid groups, alkali metal salt groups thereof or mixtures thereof as the cation exchangeable groups in the cation exchange membrane.

3. A method according to claim 1 or 2 wherein one surface of the cation exchange membrane has groups of —SO$_2$NMR$_1$ wherein M is H or an alkali metal atom; R$_1$ is —C$_n$H$_{2n+1}$ (n=0 to 6), —C$_n$H$_{2n}$COOM (n and M are defined above

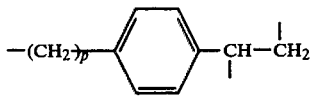

(p=0 to 6); phenyl group or R$_2$MNO$_2$S— (M is defined above; R$_2$ is

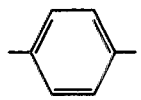

or —C$_m$H$_{2m}$— (m=1 to 6) and the other part of the cation exchange membrane has —SO$_3$M (M is defined above).

4. A process according to claim 1 or 2 wherein one surface of the cation exchange membrane has groups of —COOM (M is the same); and the other part of the membrane has the group of SO$_3$M (M is defined above).

5. A method according to claim 1 or 2 wherein all of ion-exchangeable groups in the ion exchange membrane are the groups of —COOM (M is defined above).

6. A method according to claim 1 wherein the organic solvent is selected from the group consisting of ethyleneglycol, propyleneglyocl, isopropylene-glycol, butanediols, pentanediols, hexanediols and glycerin.

7. A method according to claim 1 wherein the organic solvent is polyethyleneglycol.

8. A method according to any one of claims 1, 2, 6 or 7 wherein the treatment with the hydrochloric acid is carried out at a concentration of 0.05 N to 10 N.

9. A method according to any one of claims 1, 2, 6 or 7 wherein the treatment with hydrochloric acid is carried out at 40° C. to 95° C.

* * * * *